UNITED STATES PATENT OFFICE 2,659,713

PROCESS FOR PREPARING LINEAR POLYAMIDES

Eugene Edward Magat, Wilmington, Del., assignor to E. I. du Pont de Nemours and Company, Wilmington, Del., a corporation of Delaware No Drawing. Application April 18, 1950, Serial No. 156,717

4 Claims. (Cl. 260—72)

This invention relates to a novel process for the preparation of synthetic linear polyamides, and more particularly, to a process for preparing linear polyamides in which the amide nitrogen atoms of the recurring structural unit of the polymer are separated by a single methylene, i. e., —CH$_2$—, group.

A new class of synthetic linear polyamides characterized in that the amide nitrogen atoms of the recurring structural unit of the polymer are separated by a single methylene group are disclosed and claimed in my copending application Serial No. 26,001, filed May 8, 1948. These polymers are particularly useful in the form of filaments, fibers, yarns, fabrics, films and like structures.

An object of this invention is to provide a new and economical process for preparing linear polyamides in which the amide nitrogen atoms of the recurring structural unit of the polymer are separated by a single methylene group.

Another object is to prepare polyamides of the class hereinabove defined by a polymerization reaction carried out at substantially room temperature in contradistinction to the high temperatures (180°–300° C.) and hence expensive polymerization reactions required to form the linear polyamides heretofore known to the art. Other objects will appear from the description which follows.

These objects are realized by this invention which, briefly stated, comprises reacting an organic dinitrile with an N,N'-dimethylolamide of a dicarboxylic acid and having the formula:

HO—CH$_2$—NH—CO—R—CO—NH—CH$_2$—OH wherein R is any divalent hydrocarbon or heterocyclic radical which may contain halogen substituents, in the presence of a strong acid catalyst. After the reaction has proceeded for a length of time sufficient to form a polymer of the desired high molecular weight, a polymer, which has the characteristic recurring group of a polyamide, may be isolated by precipitation with water followed by neutralization, filtration and drying. This product may then be melt-, dry-, or wet-spun or cast to form filaments, fibers, films, etc. by processes well known to the art.

The principle of this new reaction is shown by the following general equation and formulae, wherein the catalyst is a strong acid, R is any divalent hydrocarbon radical, R' is any divalent organic group and n is a whole number:

The operable dinitriles may be formulated as NC—R'—CN, in which R' is a bivalent organic radical free of functional or reactive groups, i. e., groups that would increase the functionality of the dinitriles; preferably, R is selected from the groups consisting of bivalent hydrocarbon radicals and bivalent heterocyclic radicals, or is nonexistent as in the case of cyanogen. The bivalent radical joining the nitrile groups may be aliphatic or aromatic, cyclic or heterocyclic, saturated or unsaturated and may be unsubstituted or substituted by groups which do not interfere with the linear polymer-forming reaction. Thus, the dinitrile may contain primary alcohol and other unreactive groups, for example primary ether, sulfide, ketone, ester of primary alcohol, amide, halogen and the like. Specific suitable dinitriles by way of example are the following: malononitrile, succinonitrile, azelonitrile, sebaconitrile, isophthalonitrile, phthalonitrile, 1,8-naphthalodinitrile, hexahydroterephthalonitrile, beta-phenyl adiponitrile, beta-methyl adiponitrile, 4-ketopimelonitrile, 3-nitrophthalonitrile, 1,4-dicyanobutene-2. Preferably the radical joining the nitrile groups is a bivalent hydrocarbon radical. A mixture of two or more dinitriles may be used if copolymers are desired.

Any N,N'-dimethylolamide of a dicarboxylic acid and having the formula:

HO—CH$_2$—NH—CO—R—CO—NH—CH$_2$—OH wherein R is a divalent radical from the group consisting of hydrocarbon, and heterocyclic radicals, and halogen-substituted hydrocarbon and heterocyclic radicals, may be used for purposes of this invention. Representative specific N,N'-dimethylol-carboxylic acid amides are: N,N'-dimethyloloxamide, N,N' - dimethylolmalonamide, N,N' - dimethylolsuccinamide, N,N' - dimethylolglutaramide, N,N'-dimethyloladipamide, N,N'-dimethylolsuberamide, N,N'-dimethylolsebacamide, N,N'-dimethylolhydromuconamide, N,N'-dimethylolterephthalamide, N,N' - dimethylolphthalamide, N,N'-dimethylolbibenzoic acid diamide, N,N'-dimethylol naphthalene dicarboxylic acid diamide, N,N' - dimethylolhexahydroterephthalamide, and N,N'-dimethylolthiophene dicarboxylic acid diamide. Generally speaking all N,N'-dimethylol derivatives of diamides of dicarboxylic acids are operative. Here again, copolymers may be prepared by using two or more N,N'-dimethylolamides of dicarboxylic acids.

An alternative group of related reactants suit-

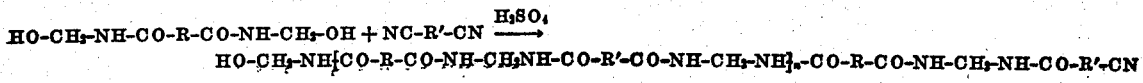

able for preparing polyamides comprises the N-methylolcyanoamides. With this class of reactants a self-condensation occurs under the conditions of the process of this invention and a polyamide is formed. As suitable examples of this group of reactants there may be mentioned: N-methylolcyanoacetamides, N-methylolcyanopropionamides, N-methylolcyanobutanamides, N-methylolcyanovaleramides, N-methylolcyanocaproamides, N-methylolcyanolauramides, N-methylolcyanostearamides, N-methylolcyanobenzamides and chloro, fluoro and/or alkyl derivatives thereof, N-methylolcyanotoluamides, N-methylolcyanophenylacetamides, N-methylol-ω-cyanoalkylbenzamides, and N-methylolcyanoalkylthiophene carboxylic acid amides.

The preferred process is to carry out the subject reaction in the presence of a molecular equivalent of water. A large excess of water, however, should not be used since it will slow down or inhibit the reaction. The reactant mixture may be poured into water to separate the polymeric material, after which the steps of neutralization and purification may be followed.

It is preferable to use a 1:1 mol ratio within ±10% of dinitrile and N,N'-dimethylolamide of the dicarboxylic acid if a relatively long-chain polymeric product is desired. If a higher ratio of one or the other is present, the excess constituent tends to serve as a diluent and polymerization is restricted, since each embryonic polymeric molecule can only grow to the extent of availability of the component present in the present in the smaller amount.

It has been found, in general, that strong acids are useful as catalysts for the process of this invention. Examples of suitable acids are sulfuric acid, phosphoric acid, alkane sulfonic acids, or a mixture of various acids, such as a mixture of sulfuric and formic acids. The acid catalyst may very conveniently be used as the reaction medium.

In general, it is not necessary to heat the reagents since the reaction usually takes place spontaneously with more or less evolution of heat. In some cases, however, where less active reactants are employed, heating may well be advantageous. The reaction may be carried out in the range of —20° C. or lower up to 80° C. or higher, with the optimum range 20° C. to 40° C. preferred. External cooling of the reaction mixture may be employed where volatile reactants are used or the nature of the reactants is such that external cooling is needed to keep the temperature below about 80° C.

The time of reaction required has been found to vary somewhat according to the particular reactants used, although a few hours are sufficient to substantially complete the reaction in most cases. The particular acid medium in which a reaction takes place may also increase or decrease the time necessary for a complete reaction. In some cases a very short period, about an hour or less, is sufficient, although in the case of less reactive ingredients, this time of reaction may run up to as much as one or two days or more.

The order in which the reactants are mixed is not important and may be varied to suit the particular case in hand. It has been found advantageous, however, in most cases to mix or dissolve the N,N'-dimethylolamide of a dicarboxylic acid in the dinitrile first and then add this mixture to the acid solvent. This, however, is not an essential step in the process and merely constitutes a convenient method for adding the reactants in equivalent amounts.

It is preferred that the concentration of the reactants in the acid catalyst be rather low so that rate of reaction will not be too fast and cause gelation before the reactants have been completely added to the acid. Concentration of the reactants in the acid may be from 2 to 40% by weight based on the total weight of the reaction mixture, with the range 10 to 20% preferred.

Polyamides of this invention may be prepared in reactors constructed of or lined with glass, porcelain, enamel, silver, gold, platinum, etc., the main requirement being, of course, that the acid used in the catalyst should not react with the reactor material. This is rather important since certain metal salts have a tendency to produce colored polymeric product and may, in fact, inhibit the reaction.

The properties of a given polyamide, of course, will vary over a considerable range depending upon the molecular weight. Average molecular weights of the polyamides are very difficult to determine because of their limited solubility in suitable solvents. However, since intrinsic viscosity gives an indication of the degree of polymerization, it is to be used hereinafter as a measure thereof. It suffices to say that, in general, the process of this invention is capable of producing polyamides having intrinsic viscosities varying from 0.1 to 2.5 or higher which comprehend polyamides of filament- and film-forming ability.

The expression "intrinsic viscosity" denoted by the symbol $(\eta_0)$, used herein as a measure of the degree of polymerization of the polyamide, is defined as follows:

$$\frac{\ln (\eta_r)}{C} \text{ as } C \text{ approaches } 0$$

wherein $(\eta_r)$ is the viscosity of the solution of the polyamide in meta-cresol divided by the viscosity of meta-cresol per se measured in the same units at the same temperature, and $C$ is the concentration in grams of the polyamide per 100 cc. of solution.

The following examples wherein are set forth preferred embodiments further illustrate the principles and practices of this invention. Parts are by weight unless otherwise indicated.

*Example I*

A mixture of 14.1 parts of N,N-dimethyloladipamide and 5.8 parts of adiponitrile was added to a solution 96% sulfuric acid (36.7 parts) and 90% formic acid (65.0 parts) slowly with stirring. The reaction temperature was maintained at 30° C. for one hour. The solution was then poured into an excess of water to precipitate a polyamide having characteristic groups of the formula $[CO-(CH_2)_4-CO-NH-CH_2-NH]$, and having an intrinsic viscosity of 0.60. The yield was 69% (13.8 parts).

*Example II*

7.2 parts of 5-cyanovaleramide was mixed with 4.85 parts of 37% aqueous formaldehyde and 0.1 part of potassium carbonate was added as catalyst. The solution was heated to 70° C. on a steam bath for one-half hour, and thereafter cooled. To this solution there was added 28.4 parts of 100% formic acid, and then 22.0 parts of concentrated (96%) sulfuric acid was added with stirring and cooling to 30° C. Stirring was continued for an additional 75 minutes at which time the solution was poured into an excess of water. The precipitated polyamide was filtered, washed with water, and dried. The yield was 5.8 parts (65%) and the intrinsic viscosity of the polyamide was 0.49.

*Example III*

N,N'-dimethylolsebacamide (26 parts) and adiponitrile (10.8 parts) were dissolved in 90% formic acid (130 parts). To this solution was added with stirring 73 parts of 96% sulfuric acid. Cooling was necessary to maintain the reaction temperature at 30° C. After one hour an excess of water was added to the reaction mixture which caused the separation of a polyamide presumed to be of the following structure:

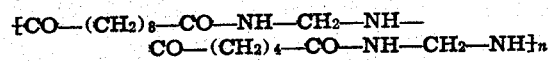

The yield was 65% (20 parts) of a polymer of intrinsic viscosity of 0.52.

*Example IV*

A mixture of isophthalonitrile (12.8 parts) and N,N'-dimethylol adipamide (25.6 parts) was added to a solution of 85% sulfuric acid (150 parts) slowly with stirring. The temperature was maintained at 30° C. for one-half hour at the end of which time the reaction mixture was poured into an excess of water. The precipitated polymer had an intrinsic viscosity of 0.39 and probably had the following structure:

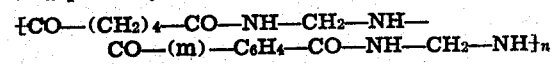

*Example V*

A mixture of N,N'-dimethylol glutaramide (12.1 parts) and glutaronitrile (4.7 parts) was added to a solution of formic and sulfuric acids as in Example I. The resulting polymer had an intrinsic viscosity of 0.55 and is believed to have had the following structure:

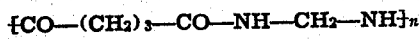

The yield was 66% (11.1 parts).

*Example VI*

N-methylol-4-cyanobutyramide (8.3 parts) was prepared from 4-cyanobutyramide and formaldehyde as described in Example II. To this solution there was added 28.4 parts of 100% formic acid and then 22.0 parts of 96% sulfuric acid. An exothermic reaction ensued and the temperature was maintained at 30° C. by cooling. After 45 minutes the reaction mixture became viscous and an excess of water was added to precipitate a white polymer which corresponded to polymonomethylene glutaramide. The yield was 52% (4.3 parts) and the intrinsic viscosity of the polyamide was 0.59.

The fiber-forming linear polyamides resulting from the process of this invention can be spun into continuous filaments in a number of ways. One method of spinning (wet process) consists in dissolving the polyamide in a suitable solvent and extruding the resultant solution through orifices into a liquid which dissolves the solvent but not the polyamide, and continuously collecting the filaments thus formed on a suitable revolving drum or spindle. Another method (dry process) consists in extruding a solution of the polyamide into a chamber (which may be heated) where the solvent is removed by evaporation. Still another method (melt process) consists in extruding the molten polyamide through orifices into a suitable atmosphere where it congeals to a filament. In these various methods of spinning, the fiber-forming mass may be forced through the orifices by means of gas pressure or by means of a constant volume delivery pump. By similar processes known to the art the polyamides can be formed into rods, bristles, sheets, foils, ribbons, films and the like. In the various methods of forming shaped articles from fiber-forming polyamides and particularly when this is done from solutions of the polymers, the characteristics of the filaments, etc. may be altered by blending the polyamides with other polyamides, such as polyhexamethylene adipamide, or with resins, plasticizers, cellulose derivatives, etc. As cellulose derivatives which can be blended with the polyamide solutions might be mentioned ethyl cellulose, benzyl cellulose, cellulose acetate, etc.

The advantages to be derived from the practice of this invention are obvious. Low temperature polymerization simplifies the equipment and gives rise to substantial savings in operation and in plant investment. An advantage of great importance, too, resides in the fact that the polymeric products resulting from the process of this invention are obtained directly in the finely divided state which obviates the necessity of the usual casting and grinding with their attendant expense and difficulties. Moreover the polyamides obtained are more readily dyeable with acetate dyes than are the polyamides of the prior art.

As many widely different embodiments may be made without departing from the spirit and scope of this invention it is to be understood that the invention is to be in no wise restricted save as set forth in the appended claims.

I claim:

1. A process for producing synthetic linear polyamides which comprises reacting an organic dinitrile of the formula: NC—R'$_m$—CN wherein R' is a divalent radical from the group consisting of hydrocarbon and unreactive heterocyclic radicals and $m$ is a numeral from 0 to 1 and an N,N'-dimethylolamide of the formula

HO—CH$_2$—NH—CO—R—CO—NH—CH$_2$—OH wherein R is a divalent radical from the group consisting of hydrocarbon, unsubstituted heterocyclic, and halogen-substituted hydrocarbon and heterocyclic radicals, in the presence of a strong acid catalyst as the reaction medium, the concentration of the organic dinitrile and N,N'-dimethylolamide together constituting from 2 to 40% by weight of the reaction mixture, and continuing the reaction until a polymer of the desired intrinsic viscosity is obtained.

2. A process for producing synthetic linear condensation polyamides which comprises reacting in the presence of a substantially molecular equivalent of water, an organic dinitrile of the formula: NC—R'$_m$—CN wherein R' is a divalent radical from the group consisting of hydrocarbon and unreactive heterocyclic radicals and $m$ is a numeral from 0 to 1 and a N,N'-dimethylolamide of the formula

HO—CH$_2$—NH—CO—R—CO—NH—CH$_2$—OH wherein R is a divalent radical from the group consisting of hydrocarbon, unsubstituted heterocyclic, and halogen-substituted hydrocarbon and heterocyclic radicals, in the presence of a strong acid catalyst as the reaction medium, the concentration of the organic dinitrile and N,N'-dimethylolamide together constituting from 2 to 40% by weight of the reaction mixture, and continuing the reaction until a polymer of the desired intrinsic viscosity is obtained.

3. A process for producing synthetic linear condensation products which comprises reacting substantially equimolar proportions of an organic dinitrile of the formula: NC—R'$_m$—CN wherein R' is a divalent radical from the group consisting of hydrocarbon and unreactive heterocyclic radicals and $m$ is a numeral from 0 to 1 and an N,N'-dimethylolamide of the formula

wherein R is a divalent radical from the group consisting of hydrocarbon, unsubstituted heterocyclic, and halogen-substituted hydrocarbon and heterocyclic radicals, in the presence of a strong acid catalyst as the reaction medium, the concentration of the organic dinitrile and N,N'-dimethylolamide together constituting from 2 to 40% by weight of the reaction mixture and continuing the reaction until a polymer of the desired intrinsic viscosity is obtained.

4. A process for producing synthetic linear polyamides which comprises reacting adiponitrile and N,N'-dimethyloladipamide in the presence of a strong acid catalyst as the reaction medium, the concentration of the adiponitrile and N,N'-dimethyloladipamide together constituting from 2 to 40% by weight of the reaction mixture, and continuing the reaction until a polymer of the desired intrinsic viscosity is obtained.

EUGENE EDWARD MAGAT.

References Cited in the file of this patent

UNITED STATES PATENTS

| Number | Name | Date |
|---|---|---|
| 2,239,441 | D'Alelio | Apr. 22, 1941 |
| 2,617,786 | Mowry | Nov. 11, 1952 |

OTHER REFERENCES

Magat et al., Journ. Amer. Chem. Soc., vol. 73, March 1951, pages 1035 to 1037.

Buc, Journal American Chemical Soc., vol. 69, February 1947, pages 254 to 256.